United States Patent
Hübinger et al.

(10) Patent No.: US 6,364,939 B1
(45) Date of Patent: Apr. 2, 2002

(54) METHOD FOR REDUCING THE FORMATION OF FOAM DURING THE TREATMENT OF A DISPERSION OR A LIQUID WITH WATER VAPOUR

(75) Inventors: Wolfgang Hübinger, Limburgerhof; Walter Holtrup, Frankenthal; Wolfgang Heider, Neustadt, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/485,458
(22) PCT Filed: Aug. 14, 1998
(86) PCT No.: PCT/EP98/05172
  § 371 Date: May 8, 2000
  § 102(e) Date: May 8, 2000
(87) PCT Pub. No.: WO99/08769
  PCT Pub. Date: Feb. 25, 1999

(30) Foreign Application Priority Data

Aug. 18, 1997 (DE) .......................................... 197 35 739

(51) Int. Cl.⁷ ............................................... B01D 19/02
(52) U.S. Cl. .......................................... 95/242; 95/264
(58) Field of Search ..................... 95/242, 264; 96/156, 96/176, 179, 202

(56) References Cited

U.S. PATENT DOCUMENTS

| | | | | |
|---|---|---|---|---|
| 2,428,045 A | * | 9/1947 | Sharp et al. | .................. 96/176 |
| 3,177,919 A | * | 4/1965 | Arant | .......................... 95/242 |
| 3,930,931 A | | 1/1976 | Baughman | ..................... 159/4 |
| 4,090,922 A | | 5/1978 | Bauer et al. | ................. 203/48 |
| 4,111,829 A | * | 9/1978 | Bimond et al. | .............. 96/176 |
| 5,015,273 A | * | 5/1991 | Hamilton et al. | ............ 95/242 |

FOREIGN PATENT DOCUMENTS

| | | | | |
|---|---|---|---|---|
| DE | 1248943 | | 7/1965 | |
| FR | 985434 | | 10/1943 | |
| JP | 53-9576 | * | 4/1978 | ................. 95/242 |
| JP | 53-37059 | * | 10/1978 | ................. 95/242 |

* cited by examiner

Primary Examiner—Duane S. Smith
(74) Attorney, Agent, or Firm—Keil & Weinkauf

(57) ABSTRACT

A process for reducing the foam formation when a dispersion or liquid is treated with steam by
  a) introduction of steam into the lower region of a column and simultaneous feed of a medium at the top of the column, the steam ascending to the top of the column,
  b) contacting the medium with the steam, with foam formation,
includes the medium fed in stage a) having been generated by mixing a dispersion or liquid with steam in an apparatus, this medium during the feed into the top of the column having a higher temperature than that of the steam which comes into contact with the medium (in stage b)).

11 Claims, 1 Drawing Sheet

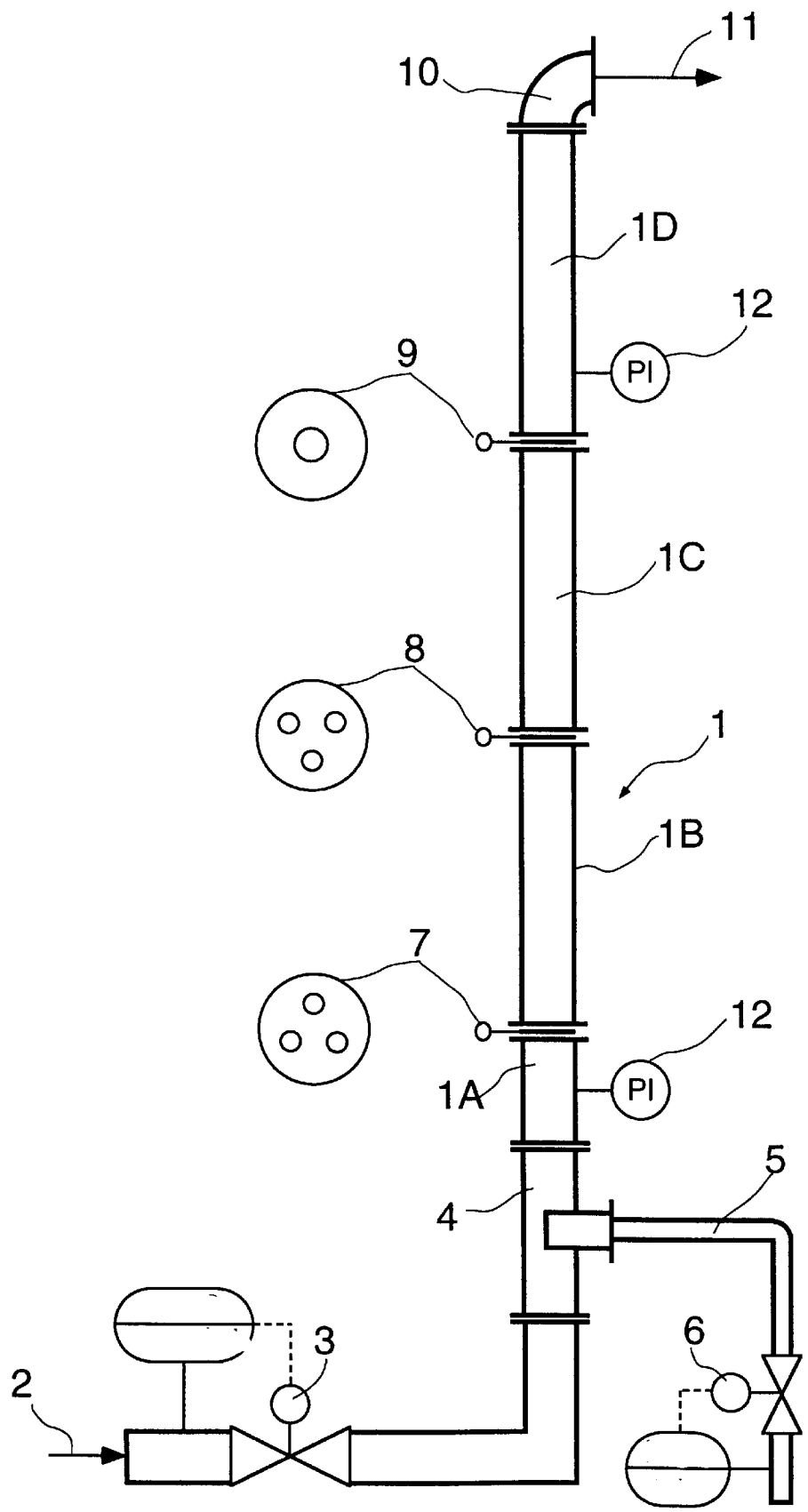

METHOD FOR REDUCING THE FORMATION OF FOAM DURING THE TREATMENT OF A DISPERSION OR A LIQUID WITH WATER VAPOUR

FIELD OF THE INVENTION

The invention relates to a process for reducing the foam formation when a dispersion or liquid is treated with steam.

BACKGROUND OF THE INVENTION

In the emulsion polymerization of unsaturated compounds, generally, polymerization is not carried out to the quantitative conversion of the monomers. Frequently, the polymerization is also intentionally terminated at a lower conversion rate. In all cases, in addition to the residual amounts of monomers, the accompanying components of the monomers used and the auxiliaries, for example the emulsifiers used, as well as the low-molecular-weight byproducts which are produced during the polymerization remain in the dispersions. These unwanted volatile organic components which remain in the product are given the collective name "residual volatiles" below. In the commission decision 96/13/EC for establishing the ecological criteria for the award of the EC eco-label to indoor paints and varnishes of Dec. 15, 1995, these residual volatiles are divided into volatile organic compounds (VOC) and volatile aromatic hydrocarbons. In both cases, these are organic compounds having a boiling point (or initial boiling point) of at most 250° C. under normal pressure conditions. The volatile aromatic hydro-carbons in this case have at least one aromatic nucleus in the structural formula. The collective term "residual volatiles" used here denotes all such organic compounds having a boiling point (or initial boiling point) of at most 250° C.

In addition to dispersions, liquids can also comprise residual volatiles. For example, when a dispersion formed by emulsion polymerization is broken by an electrolyte or acid, at least a portion of the residual volatiles remains in the liquid which separates off from the polymer. The residual volatiles can be a problem in environmentally appropriate disposal of such liquids. Furthermore, residual volatiles are unwanted in many applications of dispersions or suspensions, for example in the food or cosmetics sector or for indoor applications, and attempts are made to remove these as completely as possible.

Dispersions or liquids are therefore subjected to a treatment which removes the residual volatiles. This treatment is termed deodorization. Various processes and apparatuses are known for this. In addition to chemical processes, which generally only affect the unsaturated compounds, however, these are mainly stripping processes, in which a stripping gas is passed through the liquid or dispersion. It has long been known to remove residual volatiles by passing steam through the previously introduced heated dispersions or liquids. Carrying out this steam treatment poses great difficulties in the case of many polymer dispersions, particularly those having a surface tension below 40 dyne/cm, because of their content of emulsifiers which cause vigorous foaming of the dispersion. The generally large amount of foam, dependent, inter alia, on the type and concentration of the emulsifiers and other polymerization auxiliaries present, on the type and amount of the monomers present as well as on the particle size of the polymers, makes the process slow, laborious and frequently impossible to carry out. Although adding certain defoamers, such as complex alkali metal phosphates in combination with salts of polyvalent metals, allows the foaming to be decreased, addition of such defoamers is frequently undesirable from the aspect of the stability and application properties of the dispersions. For this reason, the addition of defoamers is usually avoided. Instead, for example, a steam/dispersion foam mixture is subjected to a rapid pressure drop at a high flow velocity. To destroy foam, in this case, one or more nozzle-shaped constrictions in pipe cross section and impingement or deflection baffles or similarly acting internals may be used in the paths of the steam/dispersion foam mixture. In the preferred embodiment, the steam/dispersion foam mixture is introduced tangentially into an evacuated separator at high velocity after passage through a nozzle.

The liquids or dispersions preferably used in the processes according to the invention shall now be listed below:

Liquids

The liquids used in the process according to the invention may be any liquids having a removable residual volatile content. Preferably, aqueous solutions or liquids having a tendency to foam formation are used. Examples of such liquids can be solutions which arise after separating off the polymer from suspension or emulsion polymers, or other foam-forming liquids which comprise unwanted volatile components, in particular if these liquids serve as solvents. Other examples which may be mentioned are polymer solutions, in particular aqueous polymer solutions. After preparation in the appropriate solvent, these frequently still comprise residual monomers and other components which can be removed by deodorization.

Dispersions

The dispersions used in the process according to the invention may be any dispersions which have removable residual volatile contents. Examples of such dispersions can be dispersions of contaminated soils, dispersions of inorganic particles, dispersions of biomolecules and, preferably, dispersions of organic compounds, in particular polymer dispersions. The dispersions are preferably aqueous dispersions.

In typical deodorization processes, the dispersion or liquid is fed to the top of a column, while steam is introduced in the lower region of the column. The dispersion or liquid to be deodorized passes through the column in countercurrent to the steam. In a countercurrent column of this type, the pressure at the top is reduced with respect to that at the bottom. During the deodorization of aqueous dispersions in particular polymer dispersions in deodorization columns where reduced pressure is generated at the column top, the dispersion to be deodorized foams. This very rapidly leads to complete filling of the column top with foam. When the column top is full of foam, the foam is carried along by the stripping vapor into the following condenser. Since this does not occur uniformly, but in surges, pressure fluctuations occur at the column top and ultimately in the entire column. This interferes with the steady-state operation of the column. Consequences of the pressure fluctuations range from backmixing in the column to weeping of the plates. This considerably reduces the efficiency of the columns. Moreover, in the case of vigorous foams, product can pass into the condenser and there can be lost via the discharge into the effluent. If product passes into the condenser, it is usually also further sucked into the vacuum pump and conducted by this into the exhaust gas system. If this occurs repeatedly, this can lead to destruction of the vacuum pump and blockage of the exhaust gas lines. Both necessitate plant downtimes with corresponding losses in turnover.

To avoid condenser and vacuum system filling with foam, it is known to install, between column top and condenser, a foam separator having foam destruction by means of a pressure jump (DE 12 48 943). This foam destruction by means of the pressure jump requires a sufficient pressure difference between column top and foam separator. In the case of stable, vigorous foam development, as is customary in circulating deodorization, this system generally brings good results. However, if, as is the case in deodorization columns, a foam surge and pressure fluctuations in the system are to be expected, a pressure difference necessary for reliable foam destruction is frequently not achieved. As a consequence thereof, the foam destruction does not function reliably. This is accompanied by the abovementioned disadvantages. These disadvantages have not been overcome hitherto even by means of a large and thus expensive foam separator as an additional apparatus.

SUMMARY OF INVENTION

It is an object of the present invention to improve the above-described process in such a manner that, during the feeding of foam- forming dispersion or liquids into the top of a deodorization column, the foam formation is reduced.

We have found that this object is achieved by the process for reducing the foam formation when a dispersion or liquid is treated with steam by a) introduction of steam into the lower region of a column and simultaneous feed of a medium at the top of the column, the steam ascending to the top of the column, b) contacting the medium with the steam, with foam formation.

The process according to the invention comprises the medium fed in stage a) having been generated by mixing a dispersion or liquid with steam in an apparatus, this medium during the feed into the top of the column having a higher temperature than that of the steam which comes into contact with the medium (in stage b)).

It has been found, surprisingly, that the reduction of the amount of foam occurring in the top of the column is achieved by the direct introduction of steam into the dispersion stream or liquid stream fed to the column. In more precise studies it was found that the dispersion or liquid, during feed to the column top, foams particularly vigorously when it is colder than the water vapor temperature at the column top which is established at the column pressure. Generally, the foaming can only be sufficiently reduced by, according to the invention, introducing into the dispersion or liquid sufficient hot direct steam to heat the medium, the dispersion/steam mixture or liquid/steam mixture, which is introduced into the column top, adequately (i.e. above the temperature of the steam at the column top). This is achieved according to the invention by means of a nozzle which introduces steam into the dispersion or liquid, into the vertically upright inlet tube to the column top at a sufficient distance therefrom. For this purpose, preferably, a ring-gap nozzle is used. In order that this steam is uniformly distributed in the dispersion or liquid and heats this up, horizontal plates having large orifices are provided as steam distributors in the pipe on the path up to the inlet into the column top. By this means, a backpressure is built up by at least one plate having an orifice as baffle plate. The baffle plate can also be replaced or supplemented by a diaphragm valve as adjustable throttle.

Further details and advantages of the invention can be taken from the examples which are described with reference to the drawing.

BRIEF DESCRIPTION OF THE DRAWING

The drawing schematically illustrates the apparatus which is used to generate the mixture of steam and the dispersion or the liquid which is to be fed to the top of the column.

DETAILED DESCRIPTION OF THE INVENTION

A dispersion flows into the pipe shown in the drawing and designated in general by 1 in the direction shown by the arrow 2 into the pipe which can be shut off by a valve 3. Into this pipe is inserted an injector 4, through which steam is fed via a line 5 which is provided with a valve 6. The pipe 1 is subdivided into a plurality of sections 1A to 1D, between which perforated disks are inserted. The perforated disk 7 which is the first in the direction of flow and the second perforated disk 8, which is arranged downstream of this at a distance, serve as steam distributors. The third perforated disk 9 serves as baffle plate. The pipe is connected by the bend 10 to a deodorization column (which is not shown) into which the dispersion flows in the direction shown by the arrow 11.

Example 1

In the case of one apparatus, a DN 100 pipe was used as pipe 1. The section 1A was 100 mm, and the sections 1B and 1C were each 250 mm long. The subsequent pipe 1D had a length 5 m, owing to the size of the subsequent column. The perforated disks had a thickness of 3 mm. The perforated disks 7 and 8 each had three bore holes, each of diameter 40 mm. The perforated disk 9 had a single bore hole of diameter 60 mm. 10 metric t/h of dispersion liquid were fed through the line 2. To introduce the steam via the line 5, a DN 100/50 ring-gap nozzle was used to introduce up to 500 kg/h of steam. The pressure difference was 2.5 bar. The backpressure measured by the indicators 12 was approximately 0.5 bar.

Example 2

A DN 80/25 ring-gap nozzle was installed as steam inlet nozzle for up to 500 kg/h of steam into the vertical pipe 1, expanded from originally DN 50 to DN 100, to a deodorization column for 6 metric t/h of dispersion throughput. Three baffle plates were installed at a spacing of 250 mm for mixing the steam into the dispersion. The first two disks 7 and 8 each had three bore holes, each of diameter 30 mm. The disk 9 had one bore hole of diameter 40 mm. For further enhanced condensation of steam into the dispersion, the dispersion stream was throttled firstly with a further diaphragm, of diameter of between 16 and 24 mm, depending on the viscosity, and later by a diaphragm valve for flexible adjustability.

Operating Conditions

Dispersion 1

Use Example 1

A high-solids, medium-viscosity (approximately 500 mPas), low-foaming adhesive dispersion (ACRONAL V 210®; from BASF AG) was fed at 53–55° C. at a rate of 3 metric t/h to a low-vacuum (320 mbar) horizontal separation vessel (6.3 m$^3$ volume), in order to remove volatile contaminants. The product completely filled the vessel with foam in less than 1 min. Even reducing the dispersion flow rate to 1.5 metric t/h provided no remedy. Only increasing the vacuum to 100 mbar (corresponding to a water vapor pressure at 46° C.) reduced the foam, so that the product could be purified at half the usual throughput.

However, maintaining a throughput of 3 metric t/h of dispersion should be achieved. This is not hydrodynamically possible because of the higher gas velocity at an increased vacuum. In contrast, at a lower vacuum, the process cannot be carried out because of the foam development.

A novel steam inlet appliance was experimentally installed in the product stream and used to heat up the dispersion. Feeding in as little as 100 kg/h of steam was sufficient in order to meter the product into the separation vessel completely foam-free at 3 metric t/h (fluid dynamic limit).

100 kg of steam heats 3 metric t of dispersion by about 28 K, ie. to a temperature above the boiling temperature of water at the vessel pressure of 320 mbar. This is 71° C.

Use Example 2

The dispersion (ACRONAL V 210®), for improved removal of the low-boilers, must be applied to a deodorization column. The technical arrangement was as described above and shown in the drawing. The product was applied to the column (300 mbar, 70° C.) at a rate of 10 metric t/h and at a temperature of 60° C. and completely filled the column top with foam within a few minutes, so that the process had to be terminated. The foaming was completely prevented by feeding 300 kg/h of steam into the product stream. The steam stream corresponded to a product heating by 25 K.

Dispersion 2

Use Example 3

An adhesive dispersion having medium solids content, low viscosity and normal foaming behavior (ACRONAL A 323®) was to be stripped in a deodorization column. For this purpose, the product at about 60°C was applied to the column (400 mbar, 79° C.) at 6 metric t/h. The product completely filled the smaller column top within 30 seconds. The process had to be terminated.

The same experimental set up, except for mixing in 200 kg/h of direct steam for preheating the dispersion by 25 K, using a smaller DN 80 steam admixing section, and with baffle plates having 3×40 and 1×25 mm bore holes, was operated without any problems, with little foam on the first column plate (<10 cm foam layer).

Dispersion 3

Use Example 4

A highly foaming, low-viscosity dispersion for bonding nonwoven fabrics (ACRONAL S 888 S®; from BASF AG) was stripped via the same column as dispersion 2. The product running time was 4 metric t/h. The original feed temperature of 57° C. was increased to a measured 85° C. by 200 kg/h of direct steam. The differential pressure over the column was 65 mbar. When the direct steam introduction was shut off, the product feed temperature fell within 2 min to 77° C. (column top temperature 74° C.) and the product foamed. The differential pressure over the column increased to 120 mbar and above.

To avoid interrupting the column operation, the direct steam stream of 200 kg/h was turned on again. The system stabilized within a few minutes to the previous values with little foam in the column top. The differential pressure was 65 mbar, and the feed temperature 85° C.

We claim:

1. A process for reducing the foam formation occurring when a dispersion or a liquid is treated with steam by
    a) introducing the steam into a lower region of a column and simultaneously feeding the dispersion or the liquid at the top of the column, the steam ascending to the top of the column, and
    b) contacting the dispersion or the liquid with the steam which results in the formation of the foam,
which process comprises
    feeding the dispersion or the liquid to the column in the form of a mixture generated by mixing the dispersion or the liquid with steam in an apparatus to form a dispersion/steam mixture or a liquid/steam mixture, and
    feeding the mixture into the top of the column in form of a mixture which has a higher temperature than that of the steam which comes into contact with the mixture in step b).

2. The process of claim 1, wherein the column is operated according to the principle of a countercurrent column.

3. The process of claim 1, wherein the column is operated with a reduced pressure in the upper part of the column.

4. The process of claim 1, wherein the mixture is fed into the top of the column through a nozzle.

5. The process of claim 1, wherein the mixture, during the feed into the top of the column, has a temperature which is higher by from 5° C. to 10° C. than that of the steam which comes into contact with the mixture.

6. The process of claim 1, wherein the apparatus is a tubular mixing vessel.

7. The process of claim 1, wherein, during the mixing of the dispersion or the liquid with steam in the apparatus, the dispersion or liquid is heated directly with the steam.

8. The process of in claim 1, wherein the steam is fed to the apparatus via a ring-gap nozzle.

9. The process of claim 1, wherein the steam which is fed to the apparatus is distributed uniformly in the apparatus.

10. The process of claim 9, wherein the steam is uniformly distributed in the apparatus by means of perforated disks which are provided in the apparatus.

11. The process of claim 9, wherein, after the steam is mixed with the dispersion or the liquid, a backpressure is built up in the apparatus.

* * * * *